US011200074B2

(12) United States Patent
Bat Ulzii et al.

(10) Patent No.: US 11,200,074 B2
(45) Date of Patent: Dec. 14, 2021

(54) COMMAND ASSISTANCE

(71) Applicant: INTERNATIONAL BUSINESS MACHINES CORPORATION, Armonk, NY (US)

(72) Inventors: Tsend Ochir Bat Ulzii, Tokyo (JP); Takayuki Kushida, Tokyo (JP); Yosuke Tanaka, Kanagawa-ken (JP); Jiayun Zhu, Tokyo (JP); Chikafumi Yasumoto, Tokyo (JP); Takuya Ishikawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 16/432,446

(22) Filed: Jun. 5, 2019

(65) Prior Publication Data
US 2020/0387390 A1    Dec. 10, 2020

(51) Int. Cl.
| G06F 9/451 | (2018.01) |
| G06F 9/455 | (2018.01) |
| G06F 40/274 | (2020.01) |
| G06F 8/33 | (2018.01) |
| G06F 8/34 | (2018.01) |

(52) U.S. Cl.
CPC .......... G06F 9/453 (2018.02); G06F 9/45512 (2013.01); G06F 40/274 (2020.01)

(58) Field of Classification Search
CPC ..... G06F 9/453; G06F 40/274; G06F 9/45512
See application file for complete search history.

(56) References Cited

U.S. PATENT DOCUMENTS

| 8,910,063 | B2 | 12/2014 | Sarbin |
| 9,305,092 | B1* | 4/2016 | Finkelstein ......... G06F 16/3322 |
| 9,384,184 | B2 | 7/2016 | Acuna et al. |
| 9,722,879 | B1 | 8/2017 | Muthu |
| 2007/0168946 | A1* | 7/2007 | Drissi ...................... G06F 8/71 717/110 |
| 2009/0172541 | A1 | 7/2009 | Acedo et al. |
| 2009/0182758 | A1* | 7/2009 | Lotlikar ............ G06F 16/24578 |
| 2011/0072209 | A1* | 3/2011 | Lund ........................ G06F 3/00 711/114 |

(Continued)

OTHER PUBLICATIONS

Free Software Foundation, "A Programmable Completion Example", [online], [Retrieved on Jun. 5, 2019], Retrieved from the Internet at <URL: https://www.gnu.org/software/bash/manual/html_node/A-Programmable-Completion-Example.html>, 3 pp.

(Continued)

*Primary Examiner* — Abdullah Al Kawsar
*Assistant Examiner* — David Tan
(74) *Attorney, Agent, or Firm* — Konrad Raynes Davda & Victor LLP; Janaki K. Davda

(57) ABSTRACT

Provided are techniques for new command assistance. A score is generated for each of a plurality of users based on a command execution history of a command by each of the plurality of users. A command template with the command and parameters of the command is generated in an order based on the command execution history of a user of the plurality of users having a high score. In response to receiving a portion of a new command, suggestions are provided for automatically completing the command using the command template.

18 Claims, 12 Drawing Sheets

| Command | Team Members | Total Attempts | Successful Attempts | Failed Attempts | Total parameters | Used parameters | Score |
|---|---|---|---|---|---|---|---|
| ldapsearch | Developer A | 100 | 90 | 10 | 44 | 30 | 79% |
| | Developer B | 10 | 2 | 8 | | 10 | 21% |
| | Developer C | 0 | 0 | 0 | | 0 | 0% |

250

(56) References Cited

U.S. PATENT DOCUMENTS

| | | |
|---|---|---|
| 2011/0126154 A1 | 5/2011 | Boehler et al. |
| 2013/0007700 A1* | 1/2013 | Villar .................. G06F 8/33 |
| | | 717/109 |
| 2013/0191372 A1* | 7/2013 | Lee .................. G06F 16/9535 |
| | | 707/722 |
| 2014/0067731 A1* | 3/2014 | Adams .................. G06N 20/00 |
| | | 706/12 |
| 2015/0169540 A1* | 6/2015 | Saxena .................. G06F 16/40 |
| | | 707/755 |
| 2017/0109356 A1 | 4/2017 | Sawai et al. |
| 2017/0270091 A1 | 9/2017 | Singh et al. |
| 2018/0046819 A1* | 2/2018 | Wallis .................. G06F 21/6218 |

OTHER PUBLICATIONS

Mell, P., et al., "Effectively and Securely Using the Cloud Computing Paradigm", NIST, Oct. 7, 2009, 80 pp.
Well, P., et al., "The NIST Definition of Cloud Computing", NIST, Special Publication 800-145, Sep. 2011, 7 pp.

\* cited by examiner

| Command | User (Owner) | Ordered Parameters |
|---|---|---|
| ldapsearch | User A | -D, -w, -b, -s, and objectclass |

FIG. 2A

| Command | Team Members | Total Attempts | Successful Attempts | Failed Attempts | Total parameters | Used parameters | Score |
|---|---|---|---|---|---|---|---|
| ldapsearch | Developer A | 100 | 90 | 10 | 44 | 30 | 79% |
| | Developer B | 10 | 2 | 8 | | 10 | 21% |
| | Developer C | 0 | 0 | 0 | | 0 | 0% |

FIG. 2B

COMMAND ASSISTANCE

BACKGROUND

1. Field of the Invention

Embodiments of the invention relate to new command assistance. In particular, embodiments of the invention relate to assisting users to execute new commands efficiently.

2. Description of the Related Art

As various new technologies evolve, developers need to learn the new technologies in a short time period. A conventional system may be used in development environments for development operations, such as compilations and command executions. Such a conventional system may save the history of commands executed in the past.

While learning new technologies, developers may be uncertain about the usage of commands due to insufficient experience with the commands or due to poor documentation of the commands.

For example, a developer may execute a command whose execution includes contacting a server. The following is an example command and error message:

$ ldapsearch -D cn=root -w strongPassword -b dc=com -s base objectclass=*
ldap_sasl_interactive_bind_s: Can't contact LDAP server (-1)

In this example, "ldapsearch" refers to a Lightweight Directory Access Protocol (LDAP) search command. The parameters of the LDAP search command are: -D, -w, -b, and -s. The values of the parameters may be referred to as arguments. Continuing with this example, the command execution fails, and an error message (ldap_sasl_interactive_bind_s: Can't contact LDAP server (-1)) is returned that indicates that the LDAP server could not be contacted. For a developer who executes the command for the first time, it may be hard to identify whether the error is caused by a syntax error or due to an environmental problem.

Continuing with the example, the developer may learn the usage of the command by reading documentation or a manual or by consulting a person familiar with the command. However, documentations and manuals may not be easy to understand for an inexperienced developer or may be inconsistent with the implementation of the command in certain cases. Moreover, the person familiar with the command may be not in the office or is may be too busy to assist the developer.

SUMMARY

In accordance with embodiments, a computer-implemented method is provided for new command assistance. The computer-implemented method comprises operations. A score is generated for each of a plurality of users based on a command execution history of a command by each of the plurality of users. A command template with the command and parameters of the command is generated in an order based on the command execution history of a user of the plurality of users having a high score. In response to receiving a portion of a new command, suggestions are provided for automatically completing the command using the command template.

In accordance with other embodiments, a computer program product is provided for new command assistance. The computer program product comprising a computer readable storage medium having program code embodied therewith, the program code executable by at least one processor to perform operations. A score is generated for each of a plurality of users based on a command execution history of a command by each of the plurality of users. A command template with the command and parameters of the command is generated in an order based on the command execution history of a user of the plurality of users having a high score. In response to receiving a portion of a new command, suggestions are provided for automatically completing the command using the command template.

In yet other embodiments, a computer system is provided for new command assistance. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A score is generated for each of a plurality of users based on a command execution history of a command by each of the plurality of users. A command template with the command and parameters of the command is generated in an order based on the command execution history of a user of the plurality of users having a high score. In response to receiving a portion of a new command, suggestions are provided for automatically completing the command using the command template.

BRIEF DESCRIPTION OF THE SEVERAL VIEWS OF THE DRAWINGS

Referring now to the drawings in which like reference numbers represent corresponding parts throughout:

FIG. 2A illustrates an example command template in accordance with certain embodiments.

FIG. 2B illustrates an example scores table in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
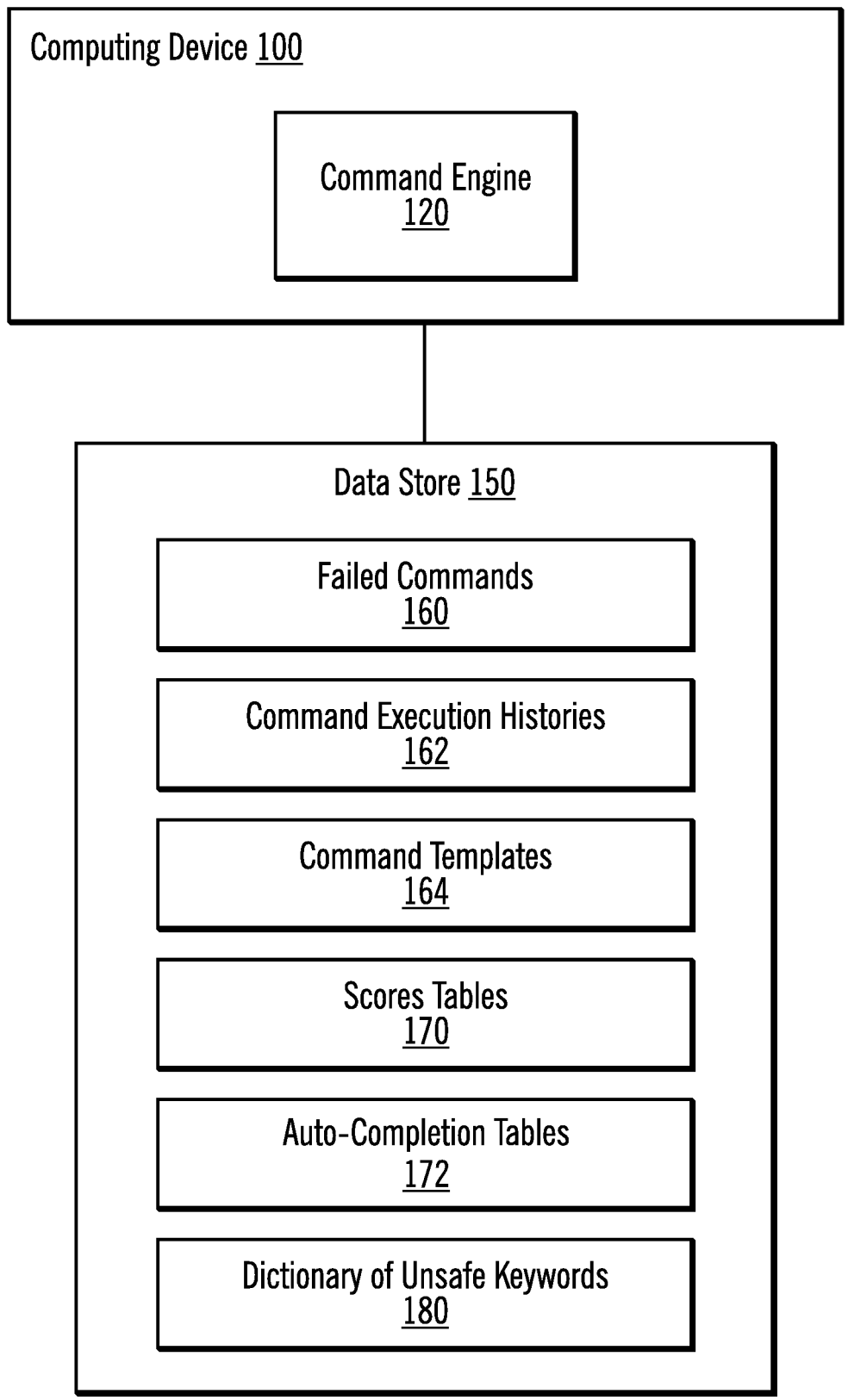
FIG. 1 illustrates, in a block diagram, a computing environment in accordance with certain embodiments.

FIG. 1 illustrates, in a block diagram, a computing environment in accordance with certain embodiments. In FIG. 1, a computing device 100 is coupled to a data store 150. The computing device 100 includes a command engine 120. The data store 150 stores failed commands 160, command execution histories 162, command templates 164, scores tables 170, auto-completion tables 172, and a dictionary of unsafe keywords 180. Each of the command execution histories 162 may be for a team member or for a team (e.g., the group of team members). In certain embodiments, the commands in the command execution histories 162 are bash commands.

The command engine 120 stores the command execution histories 162. In certain embodiments, the data store 150 is a shared database for sharing the command execution histories 162 of a team. In certain embodiments, the skill levels of team members for each command are assessed on the basis of command execution histories 162 of the team members.

For each command, the command engine 120 creates a command template 164 in which the order of parameters of the command is normalized on the basis of the command execution history 162 (e.g., of a user with a high level of skill who may be deemed an expert) and stores the created command template 164 in the data store 150.

In certain embodiments, the command engine 120 provides usage of a command in an auto-complete form in accordance with past usage of the command by a user (e.g., developer) with a high level of skill to help team member who execute the command (e.g., for the first time).

After execution of any command, the command engine 120 stores the usage of that command in a command execution history 162 in the data store 150. When storing the command usage, the command engine 120 normalizes the command in accordance with a command template 164.

The following are example commands A:
  ldapsearch -D cn=root -w strongPassword -b dc=com -s base objectclass=*
  ldapsearch -w passw0rd -D cn=admin -b dc=com objectclass=top -s sub In example commands A, the two commands are Lightweight Directory Access Protocol (LDAP) search commands for searching an LDAP server. The two commands initially look different when they are stored in the command execution history 162 for this team in the data store 150 as character strings. The command engine 150 normalizes the commands before storing them in the command execution histories 162. In certain embodiments, the normalization follows usage of the LDAP search command of a user familiar with the command (e.g., a team member with a high level of skill). The following is a normalized order of parameters of an LDAP search command: -D, -w, -b, -s, objectclass becomes normalized to -D, -b, -s, -w, objectclass. Based on this, the two commands are normalized to:
  ldapsearch -D cn=root -b dc=com -s base -w strongPassword objectclass=*
  ldapsearch -D cn=admin -b dc=com -s sub -w passw0rd objectclass=top The command engine 120 determines that the LDAP search command is to be executed with command parameters specified in the order of: -D< >-b< >-s< >-w< >objectclass=< >.

In certain embodiments, if the command execution fails, the command engine 120 stores the command as a failed command 160 in the data store 150 without normalization and stores the command in the command execution history 162 without normalization.

In certain embodiments, the command engine 120 determines ("assesses") whether a user has good knowledge of a command on the basis of a score. When storing a command in the data store 150, the command engine 120 scores each user in accordance with whether the user has correctly executed the command. The score of a user dynamically changes. The command engine 120 stores the scores of different users for each command in the scores table 170. In certain embodiments, there are different scores tables for different commands, different groups of commands, different teams, different groups of teams, etc.

In various embodiments, the command engine 120 uses any one or combination of a plurality of scoring techniques.

In a first example of a scoring technique, the command engine 120 generates a first score for a user on the basis of the how often the user executes the command successfully, generates a second score for the user on the basis if how many parameters ("command options" or "options") of the command the user includes in the command, and a total score based on the first score and the second score.

For example, if User A succeeds 90 executions in 100 executions of the LDAP search command, the command engine 120 generates a first score of 90% (i.e., $90/100$) for User A. Meanwhile, if User B succeeds 2 executions in 10 executions of the LDAP search command, the command engine 120 generates a first score of 20% (i.e., $2/10$) for User B.

Continuing with this example scoring technique, if User A has correctly used 30 parameters (-h, -p, -D, -w, . . . ) of 44 parameters of the LDAP search command, while User B has used only 10 parameters (-D, -w, . . . ) of the 44 parameters of the LDAP search command, the command engine 120 generates a second score of 68% (i.e., $30/44$) for User A and generates a second score of 22% (i.e., $10/44$) for User B.

Then, the command engine 120 generates a total score for of 79% (i.e., ½ 90%+½ 68%) for User A and generates a total score of 21% (i.e., ½ 20%+½ 22%) for User B. The weight applied to the first score and the second score is ½ in this example, but, in other embodiments, other weights may be used.

In a second example of a scoring technique, the command engine 120 generates a score on the basis of a period specified in a profile of the user who has executed a command. For example, the command engine 120 uses a period of the user having been in a team, a period of the user having been employed by a company or a combination of these. The period may be specified in years, months, etc. Then, the command engine 120 generates a score using a ratio of a user whose score is to be generated and the period of a user with the longest period in the team. In certain embodiments, the user whose period is the longest period is given a score of 100. The following equation may be used:

score=100*(user period/maximum user period)

For example, if the period of User A is 10 years and the period of User B is 5 years, the command engine 120 generates a score of 100 for User A and a score of 50 for User B. Thus, with embodiments, the longer the period of a user is (e.g., the longer the user has been part of a team), the higher the score would be for that user.

In a third example of a scoring technique, the command engine 120 generates a score by combining the total score of the first example and the score of the second example and taking an average of these scores. In certain embodiments, the command engine 120 generates the score by taking an average of the number of correct executions of the command (from first example) and the score based on the period (from second example).

Regardless of which scoring technique is used in various embodiments, the command engine 120 determines that the user with the highest score is a user with a high level of skill (e.g., an expert). That is, the user with the highest score A is identified as being familiar with the command. For examples herein, the command engine 120 has identified User A as having a high level of skill and being familiar with the command.

FIG. 2A illustrates an example command template 200 in accordance with certain embodiments. The command template 200 is an example of the command templates 164. The command template 200 has columns for: command (to identify the command), user (to identify the user ("owner") whose command was used to generate the command template), and ordered parameters of the command.

FIG. 2B illustrates an example scores table 250 in accordance with certain embodiments. The scores table 250 is an example of the score tables 170. The scores table 250 includes columns for: command (to identify the command), team members, total attempts of execution of the command by each team member, successful attempts of execution of the command by each team member, failed attempts of execution of the command by each team member, total parameters of the command available for the command, number of parameters used in the command executions, and a score for each team member. The scores table 250 provides information for the LDAP search command ("ldapsearch") for three team members (Developer A, Developer B, and Developer C).

The command engine 120 performs normalization in accordance with command usage of a user familiar with the command (e.g., an expert or one who has a high skill level).

The following is a first example of normalization in which User A and User B submit commands. User A is a user familiar with the command.

User A: ldapsearch -D cn=root -w strongPassword -b dc=com -s base objectclass=*
User B: ldapsearch -w passw0rd -D cn=admin -b dc=com objectclass=top -s sub On the basis of the command usage of User A, the command engine 120 recognizes "ldapsearch" as a command to be executed with parameters -D, -w, -b, -s, and objectclass, specified in this order. The command engine 120 creates a command template 164 for "ldapsearch", owner User A, and parameters -D, -w, -b, -s, and objectclass, specified in this order.

As the score of User A is 79% and the score of User B is 22% for this example, the command engine 120 normalizes the order of the parameters of User B in accordance with the usage of the command by User A, who is familiar with usage of the command. The normalization puts the parameters in the following order: -D, -w, -b, -s, objectclass=*. After normalization, the commands are as follows:

User A: ldapsearch -D cn=root -w strongPassword -b dc=com -s base objectclass=*
User B: ldapsearch -D cn=admin -w passw0rd -b dc=com -s sub objectclass=top The following is a second example of normalization in which User A and User B submit commands. User A is a user familiar with the command. In this second example, User A and User B use a different number of parameters.

User A (first command): ldapsearch -D cn=root -w strongPassword -b dc=com -s base objectclass=*
User A (second command): ldapsearch -D cn=root -w strongPassword -b dc=com -s base objectclass=* -h localhost -p 389
User B: ldapsearch -w passw0rd -D cn=admin -b dc=com objectclass=top -s sub On the basis of the first command usage of User A, the command engine 120 recognizes "ldapsearch" as a command to be executed with parameters -D, -w, -b, -s, objectclass, specified in this order.

On the basis of the second command usage of User A, the command engine 120 recognizes "ldapsearch" as a command to be also executed with parameters -D, -w, -b, -s, objectclass, -h, -p, specified in this order. The command engine 120 updates the command template 164 for this command for User A based on these additional parameters of -h and -p.

As the score of User A is 79% and the score of User B is 22% in this example, the command engine 120 normalizes the order of the parameters of User B in accordance with the usage of the command by User A, who is familiar with usage of the command.

The normalization puts the parameters in the following order: -D, -w, -b, -s, objectclass=*, -h, -p. After normalization, the commands are as follows:

User A (second command): ldapsearch -D cn=root -w strongPassword -b dc=com -s base objectclass=* -h localhost -p 389
User B: ldapsearch -D cn=admin -w passw0rd -b dc=com -s sub objectclass=top In certain embodiments, when a command is typed, the command engine 120 auto-completes the command. This may be helpful to a user who is not familiar with the usage of the command. For example, when a LDAP search command is entered, since that command is stored in a command execution history 162 and has a command template 164 with normalized command parameters of -D, -w, -b, -s, objectclass=*, the command engine 120 retrieves the command template 164 for the LDAP search command and suggests -D as a candidate once "ldapsearch" is typed. This displays the following candidate:

ldapsearch -D

If the candidate is selected by the user, the command engine 120 suggests candidates for the argument (value) of the parameter in a sequential order on the basis of scores. For example, as the score of User A is 79%, a value cn=root used by User A is suggested as the first candidate, then a value cn=admin used by User B, who has the second to highest score, is suggested as the second candidate. This displays the following:

ldapsearch -D<cn=root, cn=admin>

Continuing with this example, if the first candidate is selected by the user, the command engine 120 suggests the next command parameter in accordance with the normalized command parameters. This displays the following:

ldapsearch -D cn=root -w

In this manner, the user is guided to auto-complete the command for the LDAP search command in accordance with the normalized command parameters. Thus, an auto-completed command is one that is generated by the command engine 120 providing suggestions for automatically completing the command based on a command template 164.

If a current command being auto-completed may be executed, even though additional parameters are included in the command template 164, the command engine 120 asks the user whether to execute the command or add additional parameters.

In certain embodiments, the command engine 120 determines whether the auto-completed command may perform a destructive operation (e.g., dropping a database table that team is using) if an inexperienced user executes the command accidentally. In such embodiments, the command engine 120 may provide a warning that executing the command may result in a destructive action to the user, may notify both the user and a team manager, etc.

For a command parameter whose argument may be different with each execution of the command (e.g., a commit message for the commit command of git), the command engine 120 may suggest the most recently used argument for auto-completion.

Figure 3:
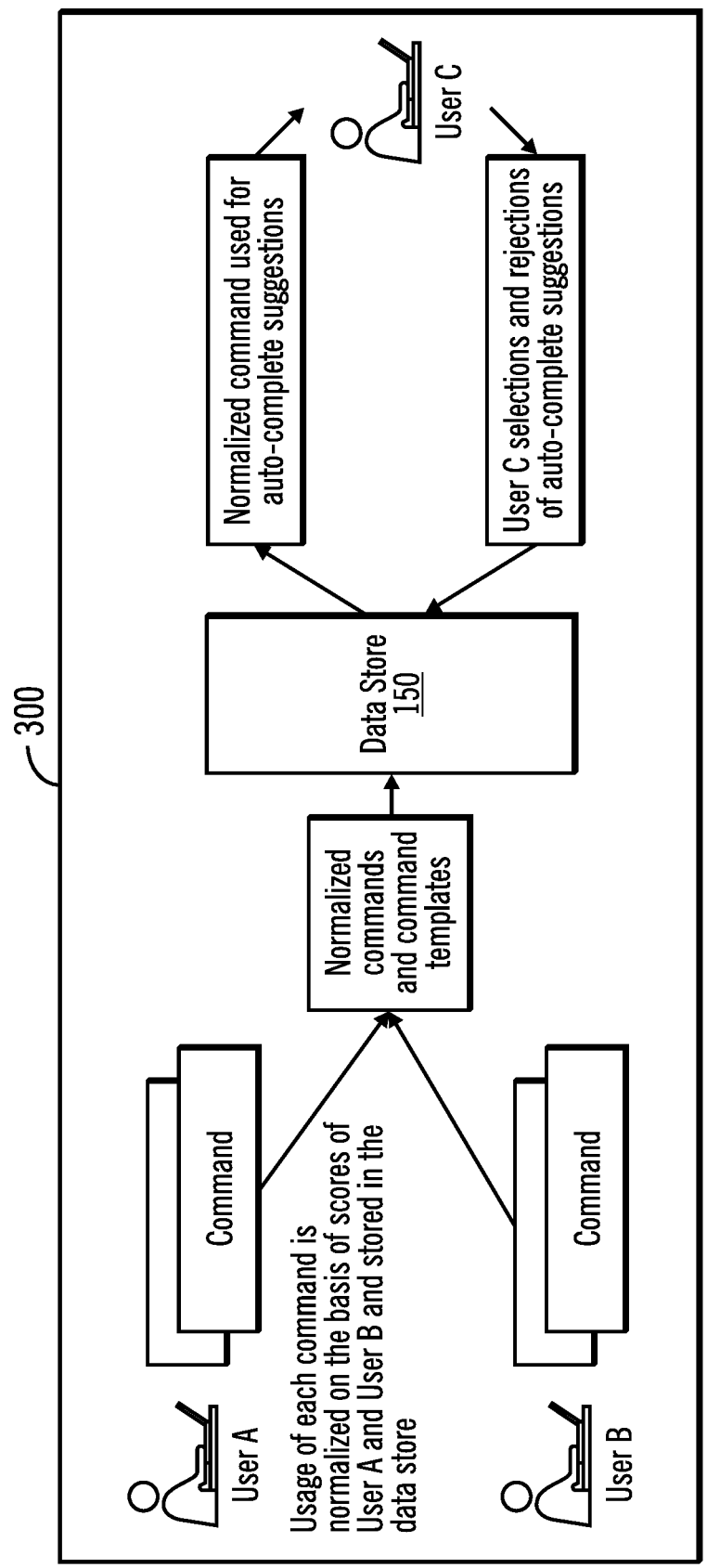
FIG. 3 illustrates an example flow of normalizing and auto-completing commands in accordance with certain embodiments.

FIG. 3 illustrates an example flow of normalizing and auto-completing commands in accordance with certain embodiments. In the flow 300, User A and User B submit commands. The command engine 120 generates a score for each user (e.g., on the basis of how often the user executes the command successfully). The command engine 120 uses the commands issued by the user with the highest score for that command to normalize the commands of the other user. The command engine 120 creates command templates from the normalized commands. The command engine 120 stores the normalized commands and the command templates in the data store 150. When User C starts to type a command, the command engine 120 identifies a command template for the normalized command and uses the command template to provide suggestions for auto-completion of the command. User C provides input to the command engine 120 by selecting or rejection the suggestions for the auto-complete of the command. In this manner, the command engine 120 checks the accuracy of usage of the command by User C against the usage of the command by another user.

Figure 4:
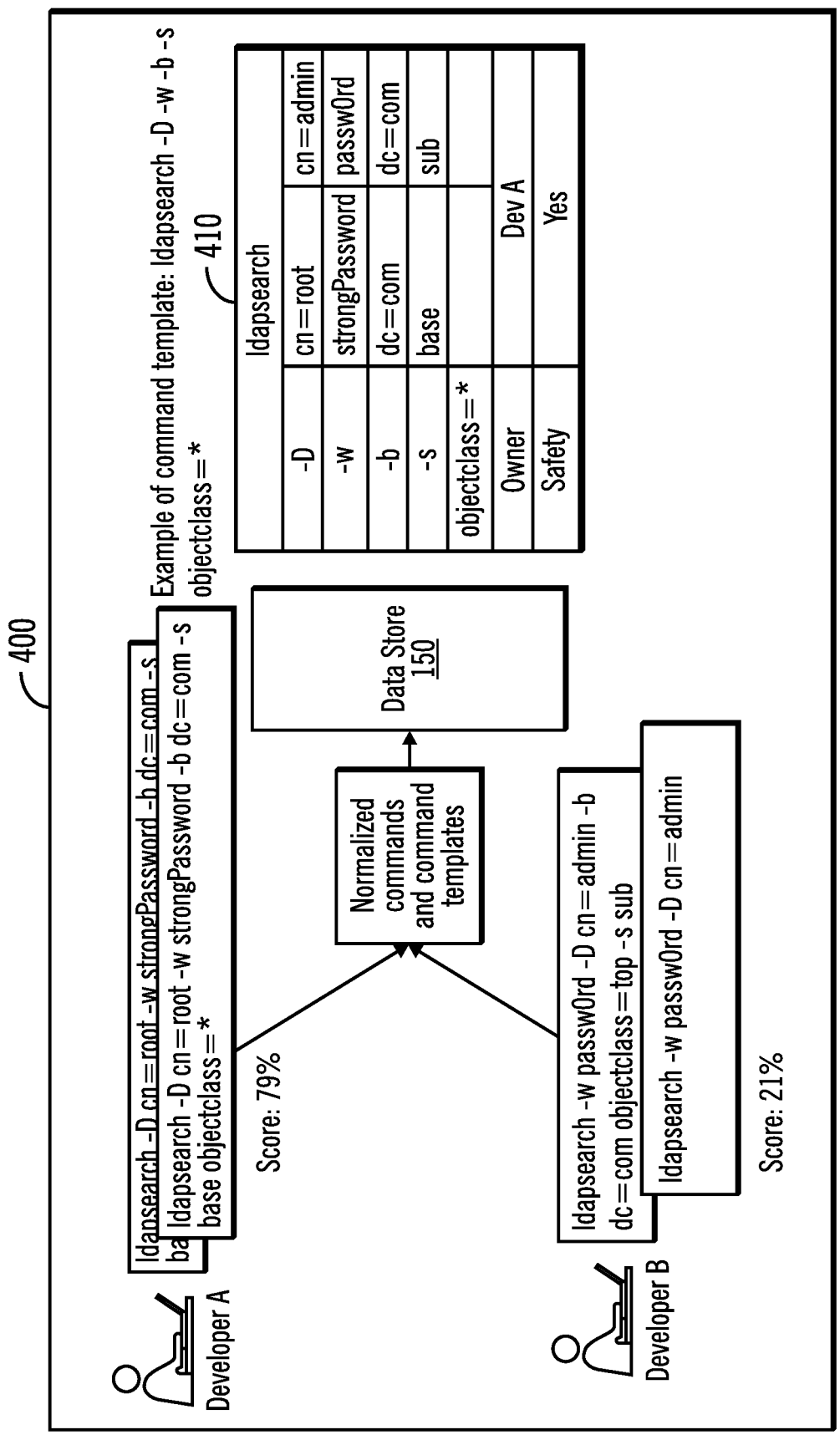
FIG. 4 illustrates another example flow of normalizing and auto-completing commands in accordance with certain embodiments.

FIG. 4 illustrates another example flow 400 of normalizing and auto-completing commands in accordance with certain embodiments. In the flow 400, Developer A and Developer B submit LDAP search commands. The command engine 120 generates a score of 79% for Developer A and generates a score of 21% for Developer B. This indicates that the number of correct executions of the LDAP search command by Developer A is larger than that of Developer B. The command engine 120 uses the commands issued by Developer A normalize the LDAP search command. The command engine 120 creates a command template from the normalized command. In this example, the template includes:

ldapsearch -D -w -b -s objectclass=*

The command engine 120 stores the normalized commands and the command template in the data store 150. In addition, the command engine 120 creates and updates the command auto-complete table 410. Since Developer A has a higher score than Developer B, the auto-complete table 410 lists the parameters of the LDAP search command in the order used in the commands submitted by Developer A.

Figure 5:
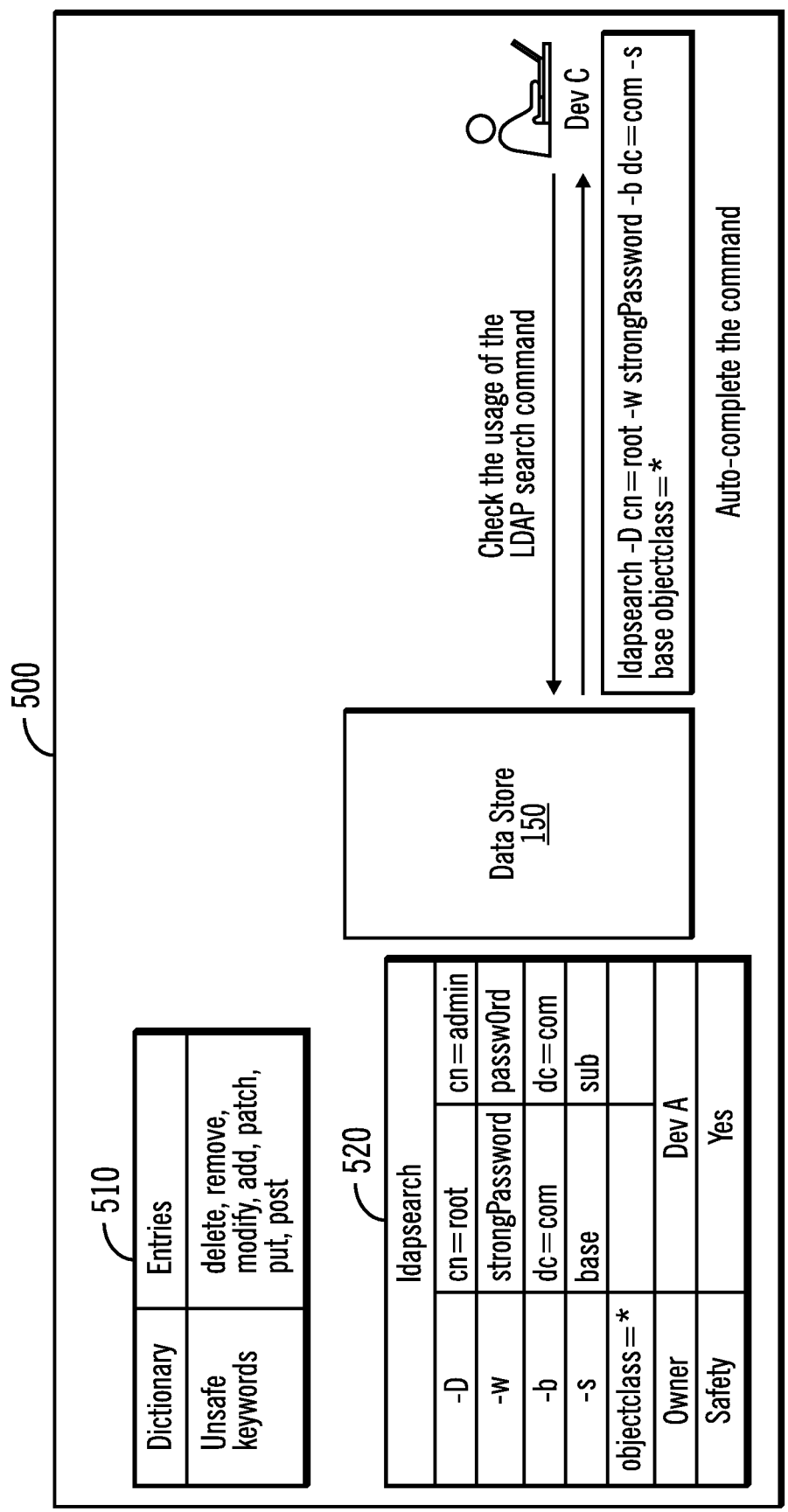
FIG. 5 illustrates example flow of checking accuracy of a command in accordance with certain embodiments.

FIG. 5 illustrates example flow 500 of checking accuracy of a command in accordance with certain embodiments. In the flow 500, Developer C enters an LDAP search command. The command engine 120 uses the dictionary of unsafe keywords 510 to determine whether the command performs a destructive operation. If so, the command engine 120 provides a warning notification, otherwise, the command engine 120 uses a command template to check the accuracy of the command. If the command is incomplete, the command engine 120 uses the auto-completion table 520 to automatically complete the command. This automatically completed command is returned to Developer C, who may then execute the command.

This processing allows Developer C to learn the correct usage of the command. In addition, even when execution of the command that has been auto-completed fails (RC!=0), Developer C is able to determine that the command execution failed, not because of incorrect command syntax, but because of an environmental problem (e.g., an incorrect user name or an incorrect password was provided).

Figure 6:
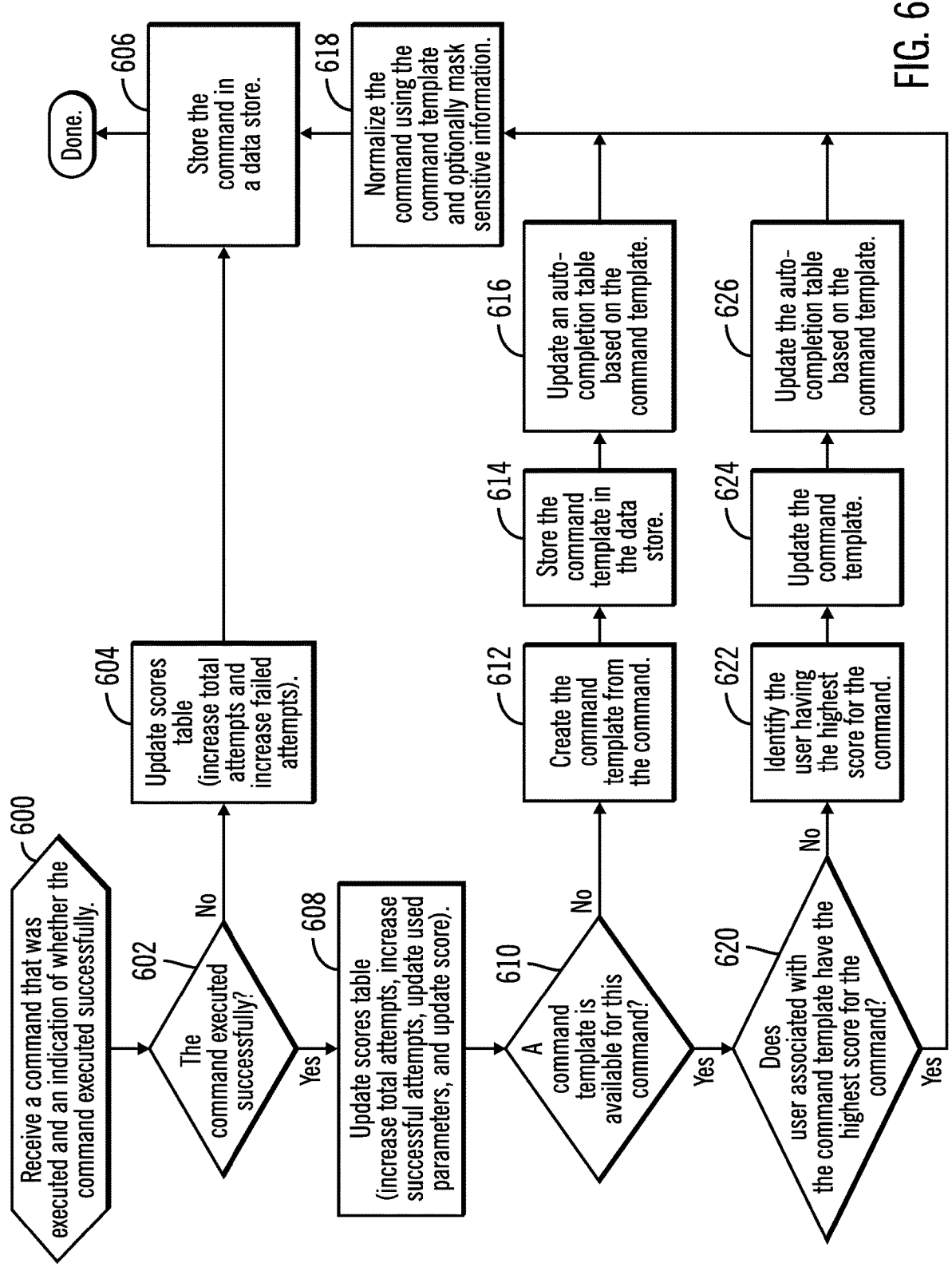
FIG. 6 illustrates, in a flowchart, operations for creating a command template, normalizing a command using the command template, and storing the command in accordance with certain embodiments.

FIG. 6 illustrates, in a flowchart, operations for creating a command template, normalizing a command using the command template, and storing the command in accordance with certain embodiments. Control begins at block 600 with the command engine 120 receiving a command that was executed and an indication of whether the command executed successfully. In certain embodiments, the indication of whether the command executed successfully is a Return Code (RC), and a Return Code of zero indicates that the command executed successfully.

In block 602, the command engine 120 determines whether the command executed successfully based on the indication (e.g., based on whether RC=0). If so, processing continues to block 608, otherwise, processing continues to block 604.

In block 604, the command engine 120 updates the scores table 170 by increasing the total attempts and increasing the failed attempts. In block 606, the command engine 120 stores the command in the data store 150 without normalizing the command (since the execution failed (i.e., was not successful)). The failed command is stored in the failed commands 160 and in one or more command execution histories 162 for one or more teams that the user is part of.

In block 608, the command engine 120 updates the scores table 170 by increasing the total attempts, increasing the successful attempts, updating the used parameters, and updating the score.

In block 610, the command engine 120 determines whether a command template is available for this command. If so, processing continues to block 620, otherwise, processing continues to block 612. The command engine 120 makes the determination by searching for a command template for the command in the command templates 164 in the data store 150.

In block 612, the command engine 120 creates the command template for the command. In block 614, the command engine 120 stores the command template in the data store 150. In block 616, the command engine updates the auto-completion table 172 based on the command template and processing continues to block 618.

In block 618, the command engine 120 normalizes the command using the command template and, optionally, masks sensitive information. From block 618 processing continues to block 606, and the command engine 120 stores the command in the data store. The successfully executed, normalized command is stored in in one or more command execution histories 162 for one or more teams that the user is part of.

In block 620, the command engine 120 determines whether the user associated with the command template has the highest score for the command in the team. If so, processing continues to block 618, otherwise, processing continues to block 622.

In block 622, the command engine 120 identifies the user having the highest score for the command in the team. In block 624, the command engine 120 updates the command template based on one or more commands executed by the user having the highest score. In block 626, the command engine updates the auto-completion table 172 based on the command template and processing continues to block 618.

In certain embodiments, the command engine 120 receives a command executed by a user and an RC of the command and updates the score of the user. The command engine 120 creates a command template 164 that becomes a base for normalization. The command engine 120 updates the command template 164 on the basis of the score. The command engine 120 normalizes the received command on the basis of the command template 164. When the normalized command is stored in the data store 150, the command engine 120 masks sensitive information, such as a password, as needed.

In certain embodiments, the command engine 120 determines whether an argument passed to a command parameter should be masked. For example, from help information or a manual of the command, the command engine 120 may determine that an argument passed for a command parameter is found to be a password. Then, the command engine 120 determines that the argument is to be masked. For example, for an LDAP search command (e.g., ldapsearch -h), the command engine 120 determines that a password follows a -w option flag (e.g., -w password bind password (for simple authentication)). In certain embodiments, the command engine 120 may prompt the user to specify which arguments are to be masked (e.g., if there is no help information or manual for the command). In such embodiments, if the user does not specify any arguments to be masked, then the command engine 120 does not mask any arguments.

Figure 7A:
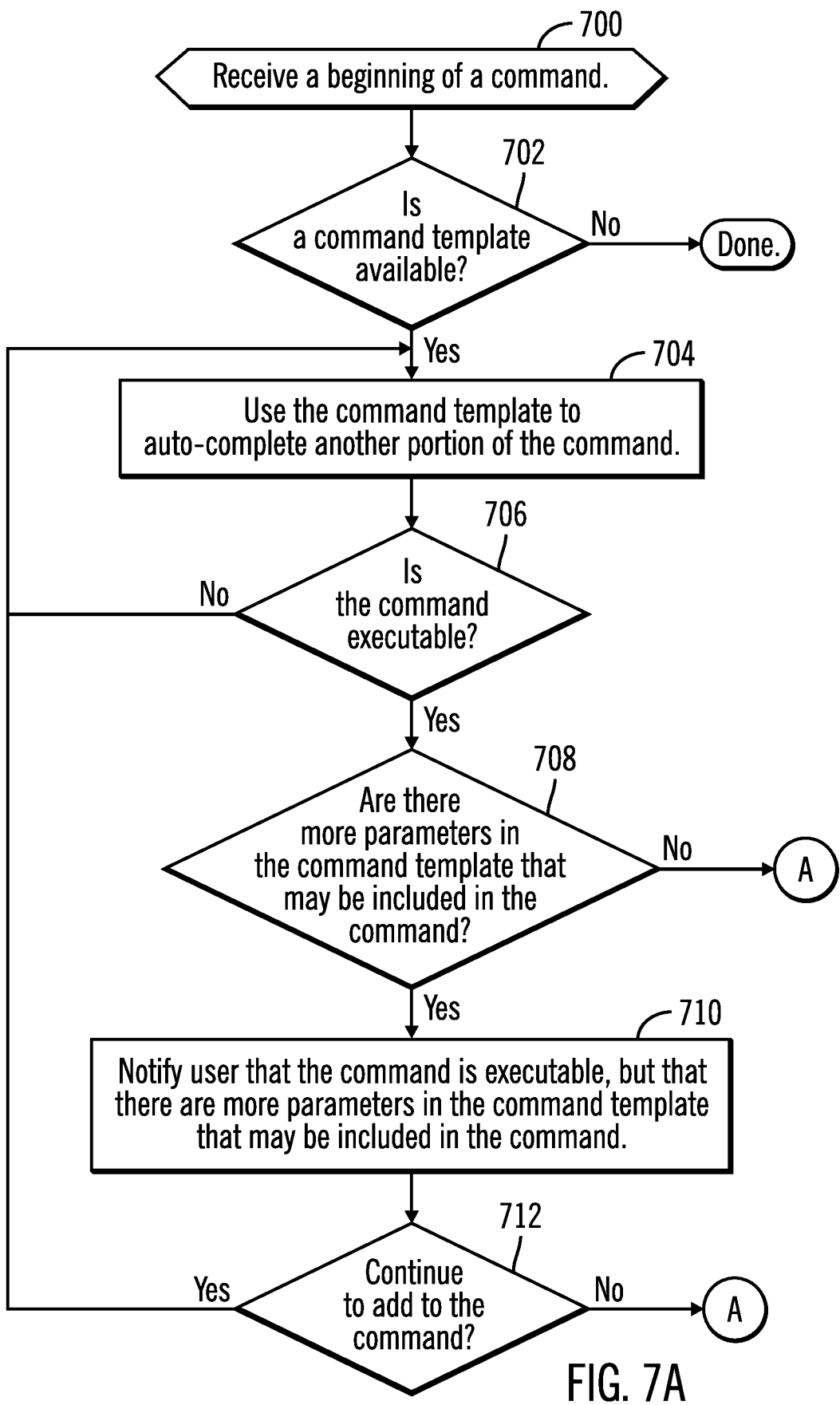
FIGS. 7A and 7B illustrate, in a flowchart, operations for providing assistance with auto-completing a command and determining whether the completed command is safe to execute in accordance with certain embodiments.
Figure 7B:
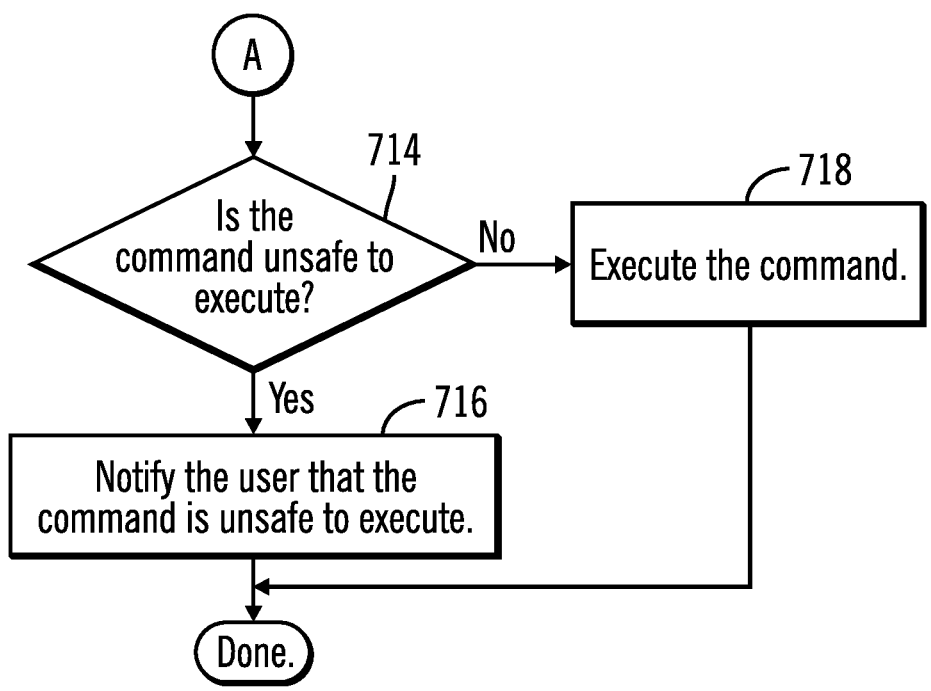

FIGS. 7A and 7B illustrate, in a flowchart, operations for providing assistance with auto-completing a command and determining whether the completed command is safe to execute in accordance with certain embodiments. Control begins at block 700 with the command engine 120 receiving a beginning of a command. In certain embodiments, this is the name of the command (e.g., "ldapsearch"). In block 702, the command engine 120 determining whether there is a command template for the command. If so, processing continues to block 704, otherwise, processing is done. The command engine 120 makes the determination by searching for a command template for the command in the command templates 164 in the data store 150.

In block 704, the command engine 120 uses the command template to auto-complete another portion of the command. For example, the command engine 120 suggests a parameter for the command, and, if the parameter is selected by the user, the command engine 120 suggests an argument for the parameter. For the operations of block 704, the command engine 120 may suggest one or more parameters.

In block 706, the command engine 120 determines whether the command is executable. If so, processing continues to block 708, otherwise, processing continues back to block 704. For example, if the command has ten parameters, with two required parameters and eight optional parameters, the command engine 120 determines that the command is executable if it has the two required parameters and zero or more optional parameters.

In block 708, the command engine 120 determines whether there are more parameters in the command template that may be included in the command. If so, processing continues to block 710, otherwise, processing continues to block 714 (FIG. 2B).

In block 710, the command engine 120 notifies the user that the command is executable, but that there are more parameters in the command template that may be included in the command.

In block 712, the command engine 120 determines whether the user wants to continue adding parameters to the command. If so, processing loops back to block 704, otherwise, processing continues to block 714 (FIG. 2B).

In block 714, the command engine 120 determines whether the command is safe to execute. If so, processing continues to block 716, otherwise, processing continues to block 718. In block 716, the command engine 120 notifies the user that the command is unsafe to execute. In block 718, the command engine 120 executes the command.

In certain embodiments, the command engine 120 automatically creates an auto-complete function for a command, using a command template. If an auto-completed command is complete enough to execute, the command engine 120 notifies the user that the auto-completed command may be executed, but that one or more parameters for the command in the command template are still available to be added to the command. By virtue of the auto-complete form, the command engine 120 prevents the user from performing a destructive operation (e.g., unintentional deletion) according to the suggested command or warns the user of such a destructive result.

In certain embodiments, the command engine 120 makes a judgement as to whether an auto-completed command performs a destructive operation by comparing words in the command to words in the dictionary of unsafe keywords 180. The dictionary of unsafe keywords 180 may include words, such as: delete, remove, modify, add, patch, put, post, etc. The command engine 120 checks the auto-completed command to determine whether the auto-completed command contains an unsafe keyword. If the command does not contain any unsafe keyword, the command engine 120 determines that the command is safe to execute. If the command does contain any unsafe keyword, the command engine 120 determines that the command is unsafe to execute. For example, an LDAP search command does not contain any keyword in the dictionary of unsafe keywords 180, and the command engine 120 determines that the LDAP search command is safe to be executed. On the other hand, an LDAP delete command contains a keyword "delete" that is in the dictionary of unsafe keywords 180, and the command engine 120 determines that the LDAP delete command is unsafe to be executed. In certain embodiments, the command engine 120 uses the character strings in the command, as well as, help information or a manual of the command (describing the usage and parameters of the command) to determine whether the command contains any unsafe keyword. For example, although the command character string itself does not contain an unsafe keyword, the command engine 120 may determine that the command is unsafe to execute based on using the manual to find that the command performs a remove operation.

Figure 8:
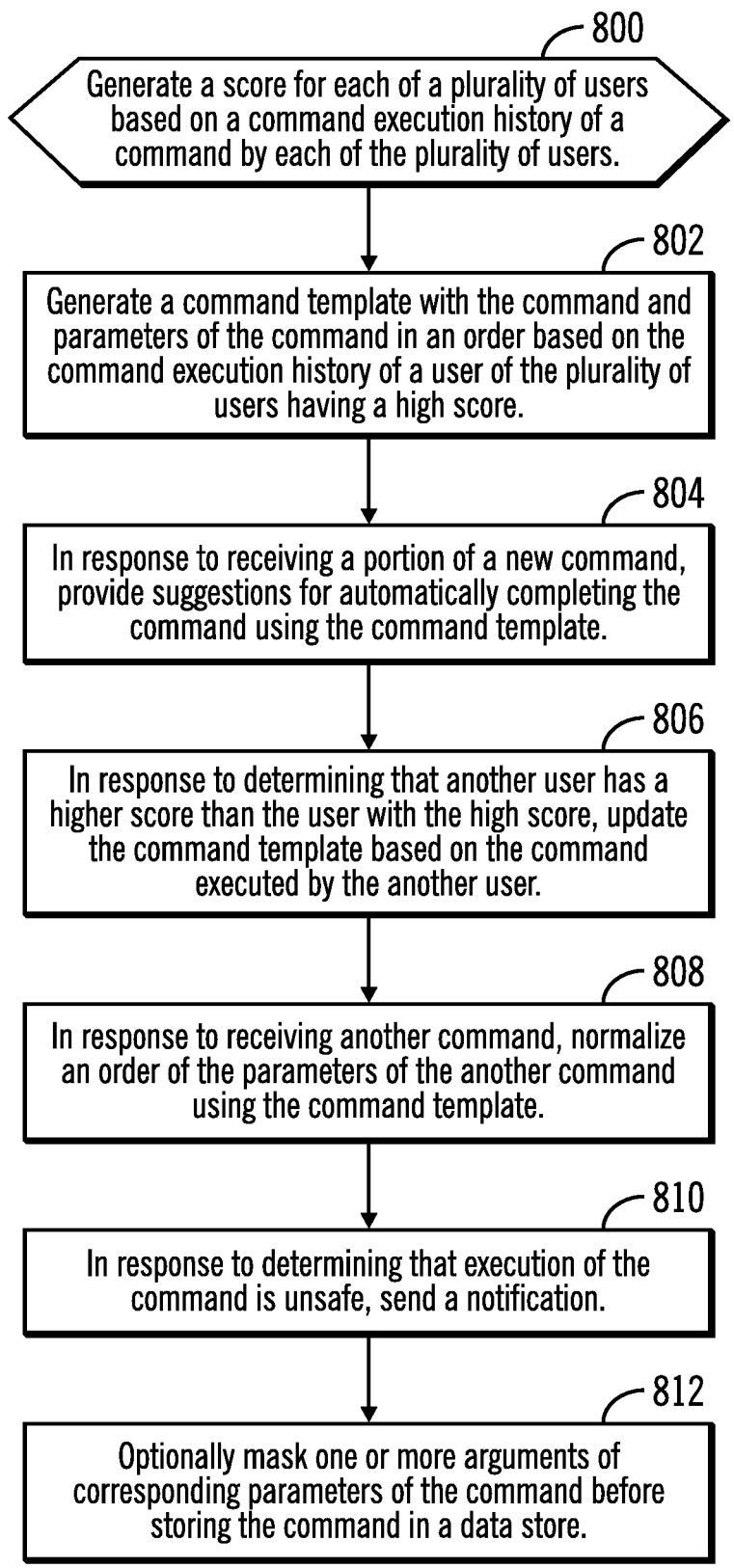
FIG. 8 illustrates, in a flowchart, operations for new command assistance in accordance with certain embodiments.

FIG. 8 illustrates, in a flowchart, operations for new command assistance in accordance with certain embodiments. Control begins at block 800 with the command engine 120 generating a score for each of a plurality of users based on a command execution history of a command by each of the plurality of users. In certain embodiments, the score is generated based on how many times each user has executed the command successfully and how many parameters each user has included in the command.

In block 802, the command engine 120 generates a command template with the command and parameters of the command in an order based on the command execution history of a user of the plurality of users having a high score. In certain embodiments, the user with the highest score is selected. If multiple users share the highest score, the command engine 120 selects one of the multiple users based on various factors (e.g., seniority of the users).

In block 804, in response to receiving a portion of a new command, the command engine 120 provides suggestions for automatically completing the command using the command template.

In block 806, in response to determining that another user has a higher score than the user with the high score, the command engine 120 updates the command template based on the command executed by the another user.

In block 808, in response to receiving another command, the command engine 120 normalizes an order of the parameters of the another command using the command template.

In block 810, in response to determining that execution of the command is unsafe, the command engine 120 sends a notification (e.g., to the user wanting to execute the command).

In block 812, the command engine 120 optionally masks one or more arguments of corresponding parameters of the command before storing the command in a data store.

Thus, embodiments avoid a user having to spend time investigating the usage of commands, which improves productivity. Also, embodiments, enable users to learn usage of a new command quickly. Embodiments are applicable for any type of command, include an Application Programming Interface (API) (e.g., a Representational State Transfer (REST) API).

In certain embodiments, the command engine 120 stores a command execution history of a plurality of users. The command engine 120 assesses, on the basis of the command execution history, a skill level of each user in executing a command. The of a plurality of users normalizes an order of parameters of a command on the basis of the command execution history of a user with a high skill level. The of a plurality of users stores the order in a shared database. Then, the command engine 120, in response to receiving a new command from a user, assists with auto-completion of the new command by presenting command parameters in accordance with the normalized order of the parameters stored in the shared database.

The command engine 120 also notifies the user that the command is currently being auto-completed may be executed or that execution of the command may cause a problem because execution of the command may result in an unintentional destructive result.

Figure 9:
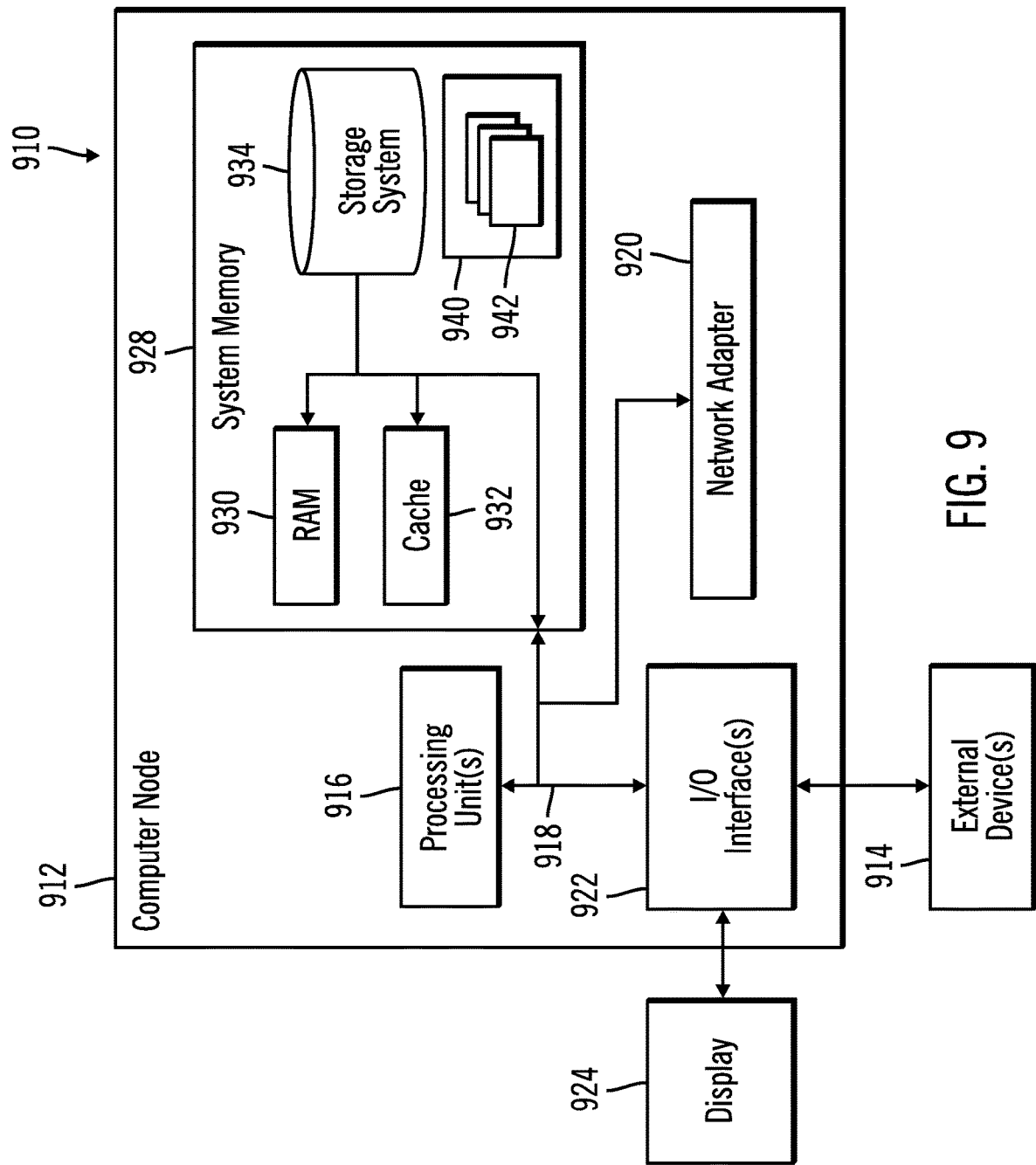
FIG. 9 illustrates a computing node in accordance with certain embodiments.

FIG. 9 illustrates a computing environment 910 in accordance with certain embodiments. In certain embodiments, the computing environment is a cloud computing environment. Referring to FIG. 9, computer node 912 is only one example of a suitable computing node and is not intended to suggest any limitation as to the scope of use or functionality of embodiments of the invention described herein. Regardless, computer node 912 is capable of being implemented and/or performing any of the functionality set forth hereinabove.

The computer node 912 may be a computer system, which is operational with numerous other general purpose or special purpose computing system environments or configurations. Examples of well-known computing systems, environments, and/or configurations that may be suitable for use with computer node 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 912 may be described in the general context of computer system executable instructions, such as program modules, being executed by a computer system. Generally, program modules may include routines, programs, objects, components, logic, data structures, and so on that perform particular tasks or implement particular abstract data types. Computer node 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer node 912 is shown in the form of a general-purpose computing device. The components of computer node 912 may include, but are not limited to, one or more processors or processing units 916, a system memory 928, and a bus 918 that couples various system components including system memory 928 to one or more processors or processing units 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 912 typically includes a variety of computer system readable media. Such media may be any available media that is accessible by computer node 912, and it includes both volatile and non-volatile media, removable and non-removable media.

System memory 928 can include computer system readable media in the form of volatile memory, such as random access memory (RAM) 930 and/or cache memory 932. Computer node 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, system memory 928 may include at least one program product having a set (e.g., at least one) of program modules that are configured to carry out the functions of embodiments of the invention.

Program/utility 940, having a set (at least one) of program modules 942, may be stored in system memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer node 912 may also communicate with one or more external devices 914 such as a keyboard, a pointing device, a display 924, etc.; one or more devices that enable a user to interact with computer node 912; and/or any devices (e.g., network card, modem, etc.) that enable computer node 912 to communicate with one or more other computing devices. Such communication can occur via Input/Output (I/O) interfaces 922. Still yet, computer node 912 can communicate with one or more networks such as a local area network (LAN), a general wide area network (WAN), and/or a public network (e.g., the Internet) via network adapter 920. As depicted, network adapter 920 communicates with the other components of computer node 912 via bus 918. It should be understood that although not shown, other hardware and/or software components could be used in conjunction with computer node 912. Examples, include, but are not limited to: microcode, device drivers, redundant processing units, external disk drive arrays, RAID systems, tape drives, and data archival storage systems, etc.

In certain embodiments, the computing device 100 has the architecture of computer node 912. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
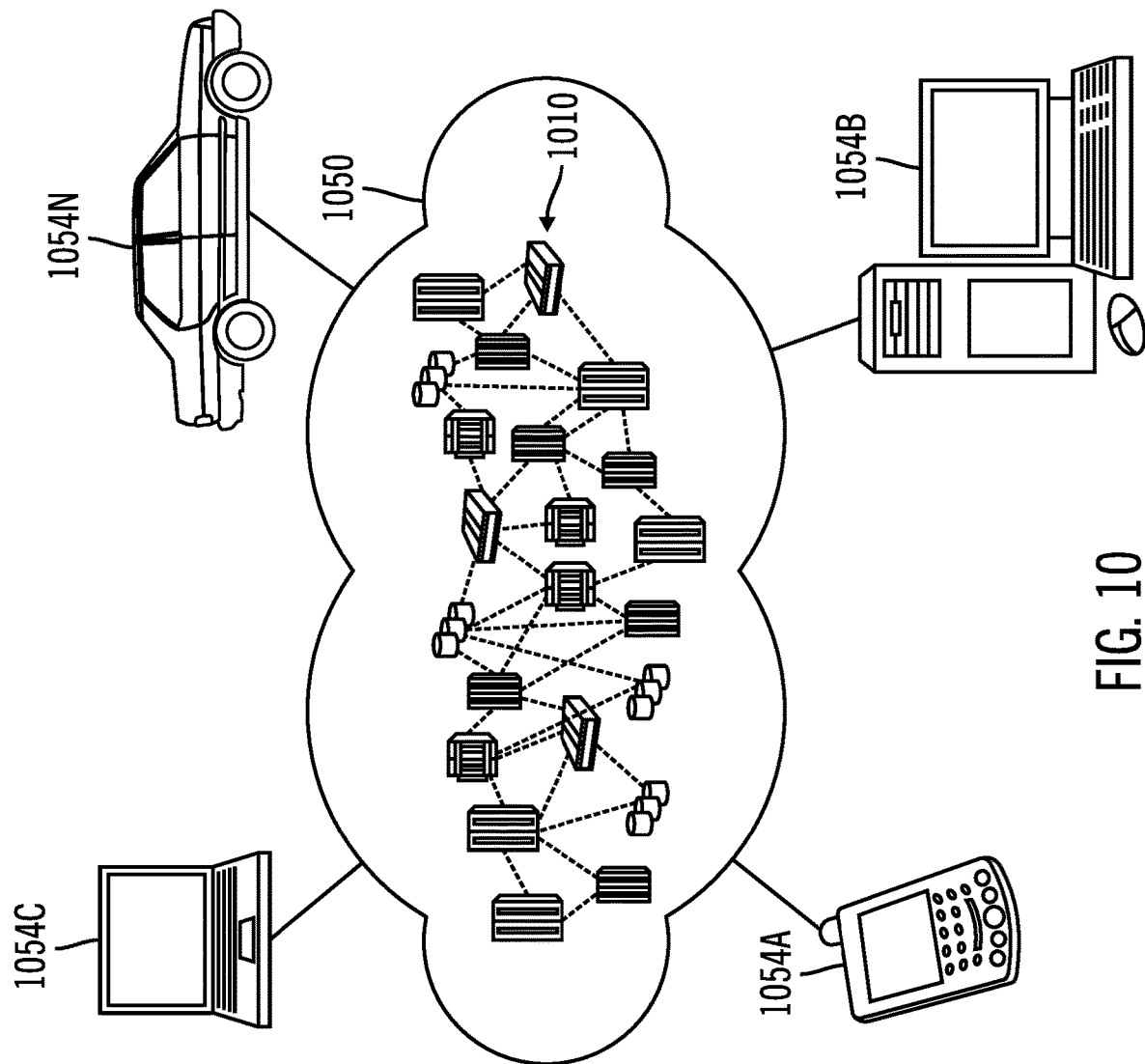
FIG. 10 illustrates a cloud computing environment in accordance with certain embodiments.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
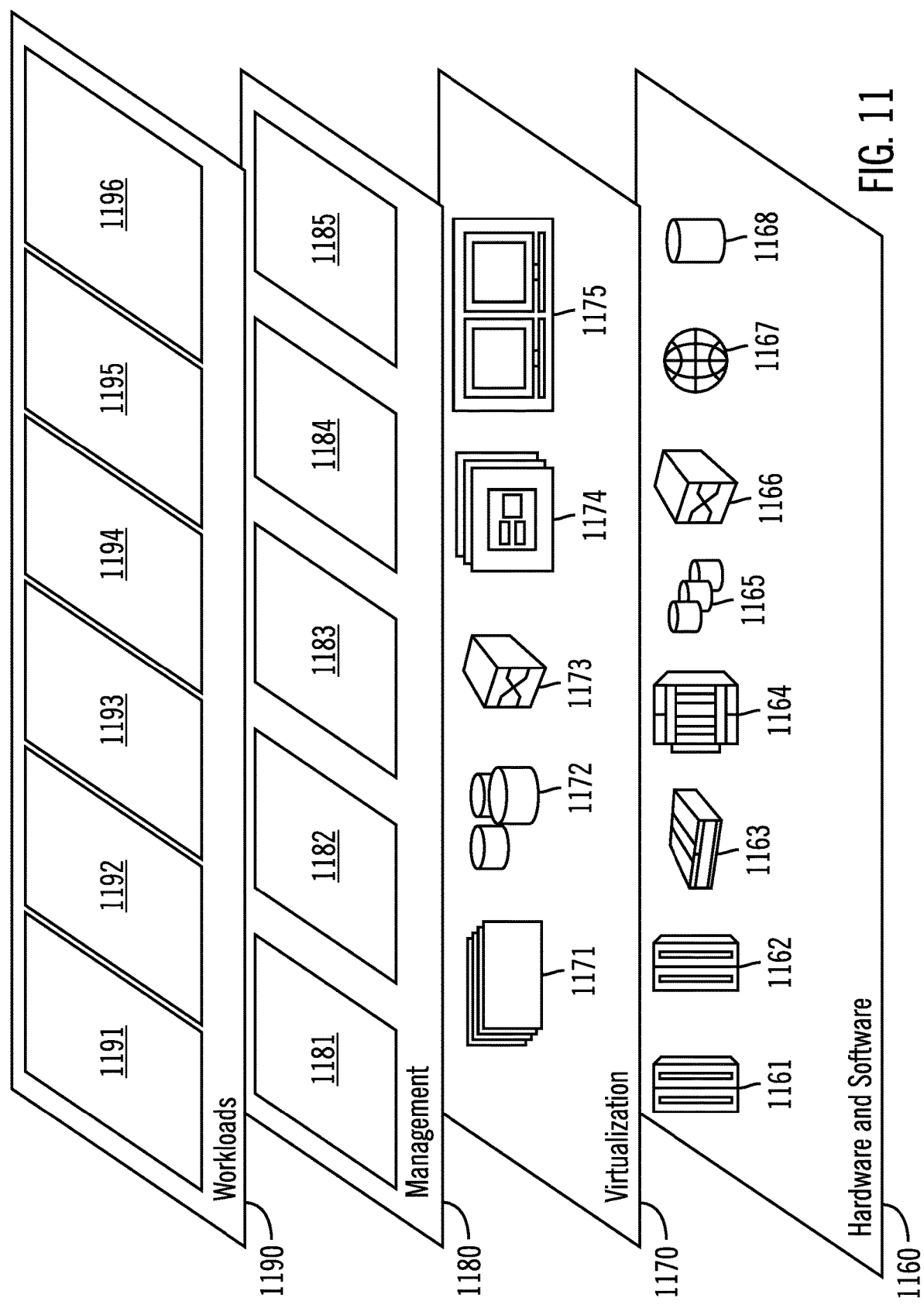
FIG. 11 illustrates abstraction model layers in accordance with certain embodiments.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and new command assistance 1196.

Thus, in certain embodiments, software or a program, implementing new command assistance in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended.

The foregoing description provides examples of embodiments of the invention, and variations and substitutions may be made in other embodiments.

What is claimed is:

1. A computer-implemented method, comprising operations for:
    generating a score for a command for each user of a plurality of users based on a command execution history of the command by each of the plurality of users, wherein the score for the command is generated for each user by:
    generating a first score for the user based on how often the user executes the command successfully using, from a scores table, total attempts of execution of the command and successful attempts of execution of the command;
    generating a second score for the user based on how many parameters of the command the user included in the command using, from the scores table, a number of total parameters available for the command and a number of parameters included by the user in the command, wherein values of the command parameters comprise arguments used with the command during command execution to identify different suggestions for command completion;
    and generating the score for the command, using one or more weights, based on the first score and the second score;
    generating a command template with the command and parameters of the command in an order based on the command execution history of a user of the plurality of users having a highest score;
    and in response to receiving a portion of a new command, providing suggestions for automatically completing the command using the command template.

2. The computer-implemented method of claim 1, further comprising operations for: in response to determining that another user has a higher score than the user having the highest score, updating the command template based on the command executed by the another user.

3. The computer-implemented method of claim 1, further comprising operations for: in response to receiving another command, normalizing an order of the parameters of the another command using the command template.

4. The computer-implemented method of claim 1, further comprising operations for: determining whether execution of the command is unsafe using a dictionary of unsafe keywords;
    in response to determining that the execution of the command is unsafe, providing a notification;
    and in response to determining that the execution of the command is safe, executing the command.

5. The computer-implemented method of claim 1, further comprising operations for: masking one or more arguments of corresponding parameters of the command.

6. The computer-implemented method of claim 1, wherein a Software as a Service (SaaS) is configured to perform the operations of the computer-implemented method.

7. A computer program product, the computer program product comprising a computer readable storage medium having program code embodied therewith, the program code executable by at least one processor to perform operations comprising:
    generating a score for a command for each user of a plurality of users based on a command execution history of the command by each of the plurality of users, wherein the score for the command is generated for each user by:
    generating a first score for the user based on how often the user executes the command successfully using, from a scores table, total attempts of execution of the command and successful attempts of execution of the command;
    generating a second score for the user based on how many parameters of the command the user included in the command using, from the scores table, a number of total parameters available for the command and a number of parameters included by the user in the command, wherein values of the command parameters comprise arguments used with the command during command execution to identify different suggestions for command completion;
    and generating the score for the command, using one or more weights, based on the first score and the second score;
    generating a command template with the command and parameters of the command in an order based on the command execution history of a user of the plurality of users having a highest score;
    and in response to receiving a portion of a new command, providing suggestions for automatically completing the command using the command template.

8. The computer program product of claim 7, wherein the program code is executable by the at least one processor to perform further operations comprising: in response to determining that another user has a higher score than the user having the highest score, updating the command template based on the command executed by the another user.

9. The computer program product of claim 7, wherein the program code is executable by the at least one processor to perform further operations comprising: in response to receiving another command, normalizing an order of the parameters of the another command using the command template.

10. The computer program product of claim 7, wherein the program code is executable by the at least one processor to perform further operations comprising: determining whether execution of the command is unsafe using a dictionary of unsafe keywords;
    in response to determining that the execution of the command is unsafe, providing a notification;
    and in response to determining that the execution of the command is safe, executing the command.

11. The computer program product of claim 7, wherein the program code is executable by the at least one processor to perform further operations comprising: masking one or more arguments of corresponding parameters of the command.

12. The computer program product of claim 7, wherein a Software as a Service (SaaS) is configured to perform the operations of the computer program product.

13. A computer system, comprising:
    one or more processors, one or more computer-readable memories and one or more computer-readable, tangible storage devices;
    and program instructions, stored on at least one of the one or more computer-readable, tangible storage devices for execution by at least one of the one or more processors via at least one of the one or more computer-readable memories, to perform operations comprising:
    generating a score for a command for each user of a plurality of users based on a command execution history of the command by each of the plurality of users, wherein the score for the command is generated for each user by:

generating a first score for the user based on how often the user executes the command successfully using, from a scores table, total attempts of execution of the command and successful attempts of execution of the command;

generating a second score for the user based on how many parameters of the command the user included in the command using, from the scores table, a number of total parameters available for the command and a number of parameters included by the user in the command, wherein values of the command parameters comprise arguments used with the command during command execution to identify different suggestions for command completion;

and generating the score for the command, using one or more weights, based on the first score and the second score;

generating a command template with the command and parameters of the command in an order based on the command execution history of a user of the plurality of users having a highest score;

and in response to receiving a portion of a new command, providing suggestions for automatically completing the command using the command template.

14. The computer system of claim 13, wherein the operations further comprise: in response to determining that another user has a higher score than the user having the highest score, updating the command template based on the command executed by the another user.

15. The computer system of claim 13, wherein the operations further comprise: in response to receiving another command, normalizing an order of the parameters of the another command using the command template.

16. The computer system of claim 13, wherein the operations further comprise: determining whether execution of the command is unsafe using a dictionary of unsafe keywords;
   in response to determining that the execution of the command is unsafe, providing a notification;
   and in response to determining that the execution of the command is safe, executing the command.

17. The computer system of claim 13, wherein a Software as a Service (SaaS) is configured to perform the operations of the computer system.

18. The computer system of claim 13, wherein the operations further comprise: masking one or more arguments of corresponding parameters of the command.

* * * * *